Figure 1:
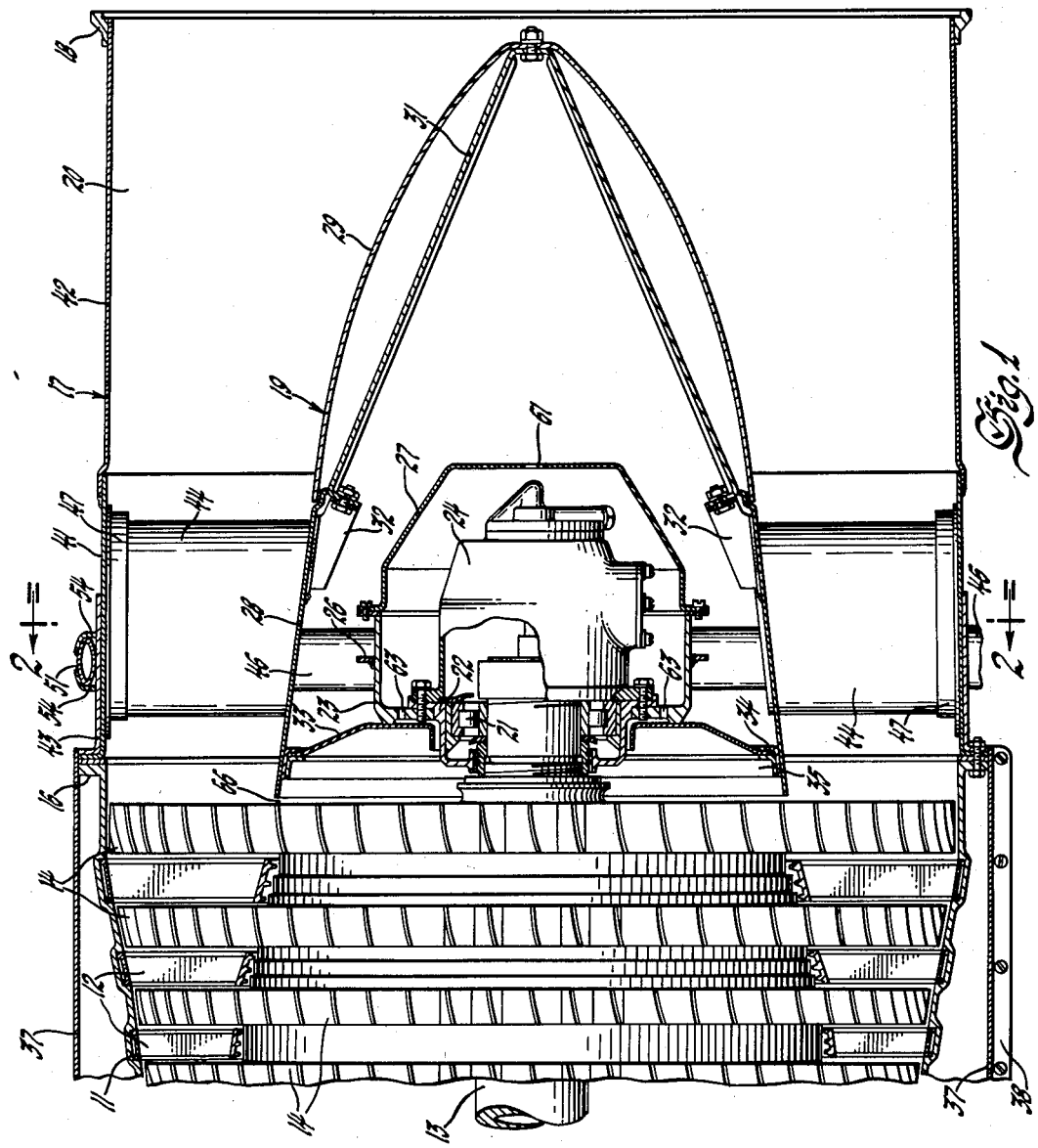

May 8, 1956 N. B. ORR 2,744,722
TURBINE BEARING SUPPORT
Filed April 6, 1951 2 Sheets-Sheet 1

Inventor
Nolan B. Orr
By Willits, Helmig & Baillio
Attorneys

United States Patent Office 2,744,722
Patented May 8, 1956

2,744,722

TURBINE BEARING SUPPORT

Nolan B. Orr, Indianapolis, Ind., assignor to General Motors Corporation, Detroit, Mich., a corporation of Delaware Application April 6, 1951, Serial No. 219,706

18 Claims. (Cl. 253—39.1)

This invention relates to supports for the bearings of rotating machinery and is particularly adapted to provide for the support of the rotor bearings of high-temperature turbines, such as gas turbines, in which the bearing is located within an annular duct through which hot gases flow.

The invention is illustrated and described herein in its preferred embodiment as applied to the support of the shaft bearing at the exhaust end of a multistage full admission gas turbine with axially directed exhaust for aircraft propulsion, but it will be understood that the invention as illustrated, or structural modifications embodying the principles of the invention, may be employed advantageously in other environments.

By way of introduction to the full description of the invention, it may be noted that aircraft gas turbine engines ordinarily are provided with axial flow turbines from which the motive fluid is exhausted through an annular duct. With multistage turbines, it is usually necessary to provide a bearing for the exhaust end of the turbine shaft, which bearing is located inside the member which forms the inner boundary of the exhaust duct. Because of the very high temperatures of the gas and the rapid heating and cooling of the parts as the engine is started and stopped; because of the necessity for a light-weight structure for aircraft engines; and because it is highly important to minimize resistance to flow of gas through the exhaust duct, the provision of adequate support for this turbine bearing presents a very difficult problem which has not to my knowledge been solved satisfactorily hitherto.

One known structure for this purpose involves a cylindrical or conical casing or duct defining the outer boundary of the exhaust passage, with a number of struts extending radially inward from this casing to the ring or the like in which the shaft bearing is mounted. The casing is fixed to the turbine stator; and the exhaust casing and the struts constitute the structural support for the bearing from the turbine stator. The struts which are aligned with a transverse load due to aircraft maneuvers are loaded in tension or compression, but load the casing in a manner which it cannot resist effectively. On the other hand, struts loaded as beams are too flexible to take the load, although they extend to the part of the casing best adapted to resist the load. Since the loading may be very heavy during radical maneuvers of the aircraft, a structure of this type having sufficient strength to resist the loads without undue deflection is unduly heavy. In this connection, it may be noted that these loads occur while all the structural parts are at an elevated temperature.

My invention is directed to a bearing support arrangement which, although light in weight, is well adapted to withstand the loads. The principal feature of the invention is the provision of a polygonal frame to which the outer ends of the struts are attached and which greatly increases the rigidity of the structure without adding a significant amount of weight. In fact, the provision of the frame permits considerable lightening of the exhaust casing, since this casing no longer is required to withstand the entire reaction of the struts in the manner of the prior structures, and the reaction is better distributed. Another important feature of the invention is that the struts are so disposed as to accommodate thermal expansion of the engine by flexion of the struts, eliminating spigot joints and the like and providing a structure in which all of the struts assist in bearing the load at all times.

These advantages are accomplished, in general, preferably by connecting the struts to the corners of the polygonal frame and disposing the struts at an angle to the radial direction preferably so that they engage the bearing mount more or less tangentially. Thermal expansion is thus accommodated by flexion of the struts and a slight relative rotation of the bearing mount and exhaust casing rather than by axial sliding of the struts at one point or another.

The invention also provides an improved arrangement for circulation of cooling air to cool the struts, the bearing supported thereby, the inner wall of the exhaust duct, and fairings provided to minimize interference with air flow through the exhaust duct by the struts and to partially insulate the struts from the hot gases.

The principal objects of the invention are to improve the performance and durability of gas turbine engines, particularly aircraft engines; to provide an improved supporting structure for a turbine bearing or the like; and to provide improved cooling means for gas turbine components. The preferred manner in which these objects are realized and the advantages of the invention will be apparent to those skilled in the art from the succeeding detailed description of the preferred embodiment of the invention.

Figure 2:
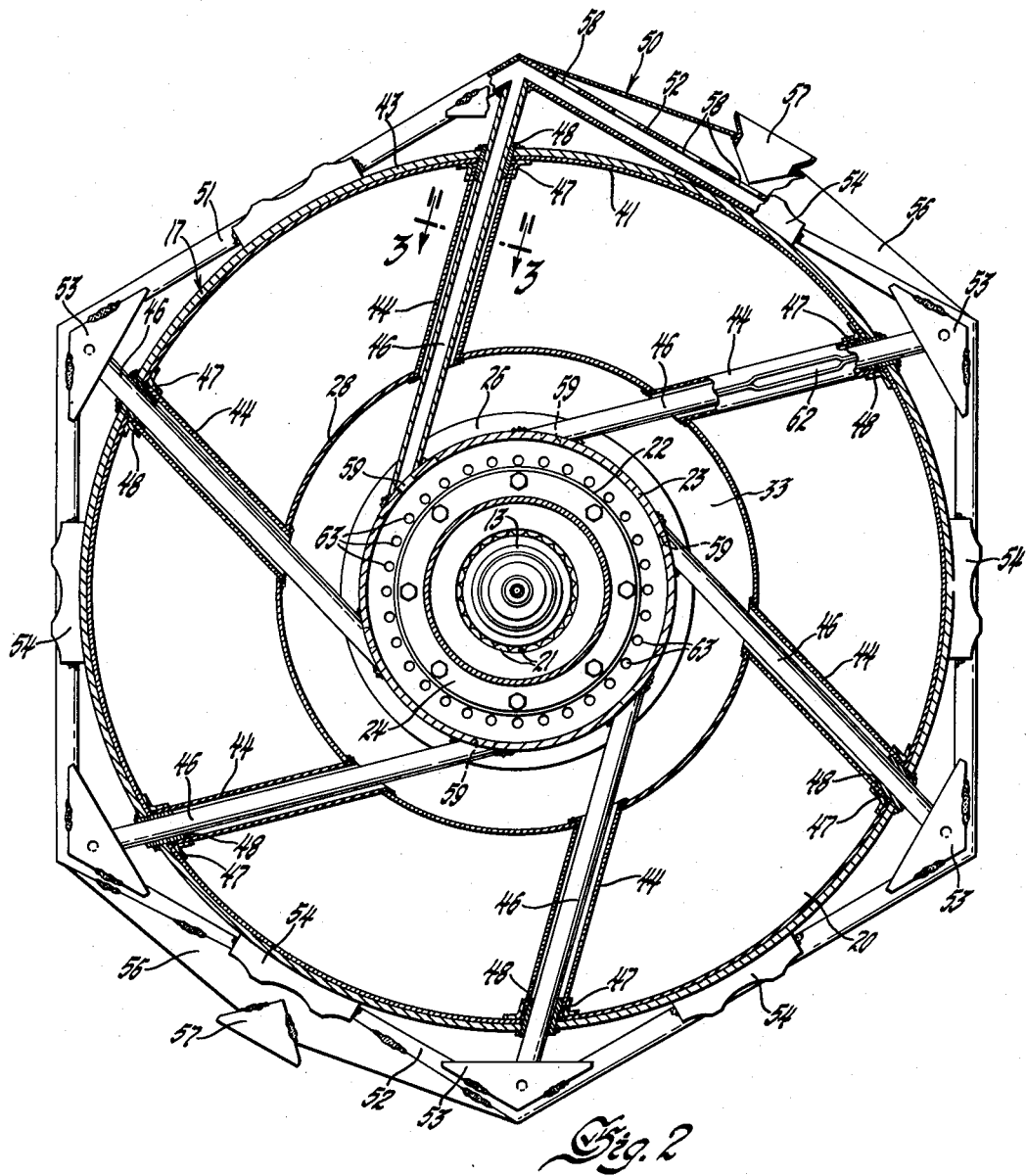
Figure 3:
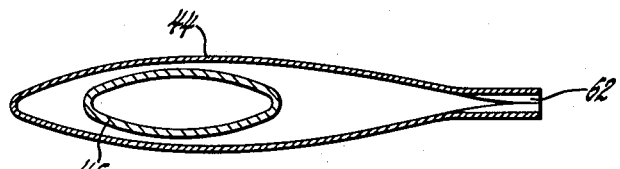

Referring to the drawings, Figure 1 is a sectional view of a portion of an aircraft gas turbine engine taken on a plane containing the axis of the engine; Figure 2 is a cross-sectional view taken on the plane indicated by line 2—2 in Figure 1; and Figure 3 is a detail sectional view taken on the plane indicated by line 3—3 in Figure 2.

Figure 1 shows the rear part of the turbine and the forward part of the exhaust duct of a gas turbine engine. The forward part of the engine has been omitted from the drawings because the structure thereof is immaterial to an understanding of the invention. The turbine comprises a stator casing 11 in which are mounted fixed vanes 12 and a rotor shaft 13 carrying bladed turbine wheels 14. The stator casing is formed with a flange 16 at the rear end to which is attached the outer casing 17 of the turbine exhaust duct which terminates in a flange 18 to which a further length of exhaust pipe may be secured. An inner exhaust duct casing or inner cone assembly 19, commonly called a tailcone, mounted within the casing 17 defines an exhaust passage 20 with a gradual transition from the annular turbine exhaust to the ordinarily cylindrical exhaust pipe, and serves as an outer enclosure or housing for the rear turbine bearing 21. The turbine shaft 13 is supported in the bearing 21 and in an additional bearing located ahead of the turbine wheels (not shown) which serves as a thrust bearing. The bearing 21 is retained in an annular bearing retainer 22 which is fixed by cap screws to a bearing mount ring 23. The bearing mount ring is in the general form of a drum with a heavy inwardly directed flange on which are mounted the bearing retainer 22 and a pump housing 24 in which is located a scavenge oil return pump. The mount 23 is also provided with a circumferential stiffening ring 26 welded thereto and is flanged at its rear end for mounting a pump housing cover 27. The bearing retainer 22, bearing mount 23, and cover 27 constitute an enclosure for the bearing 21 and pump housing 24.

The tailcone 19 comprises a frusto-conical section 28 and an ogival portion 29 mounted thereon. The portion 29 is bolted to a V-shaped bracket 31 which is bolted to brackets 32 welded to the portion 28 of the tailcone. The front wall of the tailcone is formed by an annular disk 33, which may be formed by several sectors, the outer margin of which is seated between flanged rings 34 and 35 which may be welded to the cone 28.

The stator casing 11 is enclosed in an outer casing or shell 37 which may be in several sections united at longitudinally extending flanges 38.

The structure so far described has not been described in detail, since the details thereof beyond what has been stated are immaterial to an understanding of the invention.

The outer casing 17 of the exhaust duct 20 comprises a forward section 41 and a rear section 42 which may be welded together. The forward portion 41, which constitutes a part of the support for the bearing 21, is reinforced by the provision of a second wall thickness 43. The casing portions 41 and 43 are flanged at the forward end for bolting to the rear flange 16 of the stator case. Streamlined fairing members 44 (Figs. 1, 2, and 3) extend across the exhaust duct 20 from the tailcone section 28 to the outer casing. These members 44 serve as housings for the struts 46 by which the bearing mount 23 is supported from the outer casing. They also provide a support for the cone 28, to which they are welded. The outer ends of the fairing members 44 are slidably received in sockets 47 which are of appropriate form to fit the streamlined fairing members 44. The outer ends of members 44 are spaced from the inner surface of the casing member 41 so that provision is made for differential expansion of the inner and outer walls of the exhaust duct and expansion of the fairing members 44.

The struts 46, which are tubes of oval cross-section (Fig. 3) are cut off at an angle at their inner ends and welded to the bearing mount 23 so as to extend in a generally tangential direction from the surface of the bearing ring. It will be noted that the ends of the struts 46 straddle the reinforcing flange 26 of the bearing mount. The struts 46 extend outwardly through the fairings 44 and are guided in the outer casing by elliptical sleeves 48 welded to the outer casing and extending into the outer end of the fairings 44. The outer ends of the struts 46 extend through the casing 17 and are fixed to the corners of a hexagonal frame 50. This frame is composed of six lengths of tubing of elliptical section, the struts and the tubing being welded at the corners of the frame. The frame tubings comprise four sections 51 and two sections 52, these being of the same length and dimensions. The junctions between the struts and the frame are strengthened by gusset plates 53 welded to the three intersecting tubes at each joint. The middle of each tube 51 or 52 is fixed to the casing 17, specifically the outer shell 43, by a gusset 54 on each side of the tube welded to the tube and the casing. The frame 50 constitutes means bracing the casing 17 in the plane of attachment of struts 46 thereto.

The hollow struts 46 are employed to conduct air into the engine to cool the struts, the tailcone, the rear bearing, and the fairings 44. To this end, the tube sections 52 have welded thereto sheet metal manifolds 56 provided with fittings 57 by which a conduit carrying cooling air under pressure from any suitable source may be connected to the manifolds 56. The outer face of each tube 52 is formed with air openings 58 by which air enters the hexagonal tubular frame 50. This air flows through the frame and through the interior of each strut 46 to the bearing mount 23, which is formed with an opening 59 at each strut through which the air is discharged into the interior of the chamber defined by the bearing mount and the cover 27. Some of this air flows over the scavenge pump housing 24, through an opening 61 in the cover 27, and, after circulating within the tailcone, flows into the fairings 44 which are open at the inner end. Openings 59, ring 23, cover 27, opening 61, and tailcone 19, define a conduit connecting the struts 46 to the fairings 44 for circulating the cooling air from the struts to the fairings. Each fairing member 44 is formed with an air outlet opening 62 (Figs. 2 and 3) in the trailing edge from which this air passes into the turbine exhaust. Advantage may be taken of the velocity of the turbine exhaust gases or low pressure conditions in the exhaust to aspirate the air from the openings 62.

The remainder of the air entering through the struts 46 flows forwardly through a number of holes 63 in the forward flange of the bearing mount and between the bearing mount and bearing retainer 22 and the shield or annular disc 33, thus providing additional cooling for the bearing 21. This air then flows outwardly and is drawn into the turbine exhaust through the gap 66 between the tailcone and the last turbine wheel. Normally, the pressure at this point is below atmospheric, but in any event the pressure differential between the air inlets 57 and the points at which the cooling air is discharged into the exhaust duct may be made sufficient to ensure ample circulation of cooling air.

It will be noted that the fairings 44 are cooled by the air discharged through them which reduces the heat radiated to the struts 46, and that these struts are further cooled by the air flowing over them and particularly by the air entering through the struts. This air also serves to cool the tailcone, the bearing 21 and the associated structures.

The struts being fixed to the bearing mount 23 and to the rigid frame 50, which together with the outer casing 17 forms a very stiff ring or frame, the structure is particularly adapted to withstand radial loads exerted on it by the turbine. Any relative expansion of the supporting structure can be accommodated by a slight deflection of the struts 46 and a slight rotation of the bearing mount 23 with respect to the outer casing. The fairing members 44 are entirely adequate to support the relatively slight radial stresses from the tailcone 19 and to locate this member positively against any axial or radial displacement. The angle which the struts 46 make with the radial direction from the turbine axis may vary, but, as will be apparent, if the struts are more nearly radial, the effects of thermal expansion will be more pronounced, and therefore, it is preferred to dispose them so that they are not far from a tangent relation to the surface of the bearing mount.

Although the bearing support structure is illustrated by way of example as being in the exhaust duct of a turbine, it is apparent that it is capable of beneficial use in other locations.

The principle of providing for expansion by flexion of the struts and relative movement of the parts connected thereby may be embodied in structures of various form. I believe those forms which accommodate expansion by rotation of the bearing mount to be preferable.

The invention is not to be regarded as limited in any way by the description herein of the preferred embodiment to facilitate an understanding of the principles of the invention, since many modifications may be made by those skilled in the art within the principles of the invention.

I claim:

1. A bearing support comprising, in combination, a casing, a rigid polygonal frame, the sides of which are fixed to the casing, a bearing structure located centrally within the frame, and a plurality of struts fixed to the bearing structure and extending therefrom at a substantial angle to a radial direction relative to the axis of the bearing, each strut being fixed to the frame at a corner thereof.

2. A turbine comprising, in combination, a stator, a rotor, means defining a generally annular passage for flow of motive fluid to or from the turbine including a casing attached to the stator forming the outer wall of the passage, a turbine rotor bearing structure located at the same end of the turbine as the said passage, and a support for the bearing structure comprising a polygonal frame the sides of which are attached to the casing and a rigid deformable strut connecting each corner of the frame to the bearing structure, the struts being attached to the bearing structure, each strut being disposed at a substantial angle to the radial direction from the turbine axis.

3. A turbine comprising, in combination, a stator, a rotor, means defining a generally annular passage for flow of motive fluid to or from the turbine including a casing attached to the stator forming the outer wall of the passage, a turbine rotor bearing structure located at the same end of the turbine as the said passage, and a support for the bearing structure comprising a polygonal frame the sides of which are attached to the casing and a rigid deformable strut connecting each corner of the frame to the bearing structure, the struts being attached to the bearing structure, each strut being disposed at a substantial angle to a plane containing the turbine axis and intersecting the strut.

4. A turbine comprising, in combination, a stator, a rotor, means defining a generally annular passage for flow of motive fluid to or from the turbine including a casing attached to the stator forming the outer wall of the passage, a turbine rotor bearing structure located at the same end of the turbine as the said passage, and a support for the bearing structure comprising a polygonal frame the sides of which are attached to the casing and a rigid deformable strut connecting each corner of the frame to the bearing structure, the struts being attached to the bearing structure, each strut being disposed at a substantial angle to a plane containing the turbine axis and intersecting the strut, and the frame and struts lying in a common plane normal to the turbine axis.

5. A turbine comprising, in combination, a stator, a rotor, means defining a generally annular passage for flow of motive fluid to or from the turbine including a casing attached to the stator forming the outer wall of the passage, a turbine rotor bearing structure located at the same end of the turbine as the said passage, a support for the bearing structure comprising a polygonal frame the sides of which are attached to the casing and a rigid deformable strut connecting each corner of the frame to the bearing structure, the struts being attached to the bearing structure, each strut being disposed at a substantial angle to a plane containing the turbine axis and intersecting the strut, a housing for the bearing structure, and extensible tubular members encasing the struts connected to the casing and housing and supporting the housing.

6. A turbine engine comprising, in combination, a stator, a rotor therein, means including a generally cylindrical casing attached to the stator defining a substantially annular passage for flow of motive fluid to or from the turbine, a turbine rotor bearing, a mount for the bearing, a polygonal frame circumscribing the casing, the sides of the frame being attached to the casing, and a strut connected to each corner of the frame and fixed to the bearing mount, the frame and struts constituting a support for the bearing mount and the struts being directed at a substantial angle to the radial direction relative to the axis of the passage, at least part of the support being tubular to provide a passage for conduction of air for cooling the support and structure supported thereby.

7. A turbine engine comprising, in combination, a stator, a rotor therein, means including a generally cylindrical casing attached to the stator defining a substantially annular passage for flow of motive fluid to or from the turbine, a turbine rotor bearing, a mount for the bearing, a polygonal frame circumscribing the casing, the sides of the frame being attached to the casing, and a strut connected to each corner of the frame and fixed to the bearing mount at such a location as to extend generally tangentially from the bearing mount, the frame and struts constituting a support for the bearing mount, at least part of the support being tubular to provide a passage for conduction of air for cooling the support and structures supported thereby.

8. A turbine engine comprising, in combination, a stator, a rotor therein, means including a generally cylindrical casing attached to the stator defining a substantially annular passage for flow of motive fluid to or from the turbine, a turbine rotor bearing, a mount for the bearing, a polygonal tubular frame circumscribing the casing, the sides of the frame being attached to the casing, and a strut connected to each corner of the frame and fixed to the bearing mount, the frame and struts constituting a support for the bearing mount, at least part of the support being tubular to provide a passage for conduction of air for cooling the support and structures supported thereby, and frame constituting a manifold for supply of air to the struts for conduction inwardly through the struts.

9. A turbine engine comprising, in combination, a stator, a rotor therein, means including a generally cylindrical casing attached to the stator defining a substantially annular passage for flow of motive fluid to or from the turbine, a turbine rotor bearing, a mount for the bearing, a polygonal tubular frame circumscribing the casing, the sides of the frame being attached to the casing, a strut connected to each corner of the frame and fixed to the bearing mount at such a location as to extend generally tangentially from the bearing mount, the frame and struts constituting a support for the bearing mount, at least part of the support being tubular to provide a passage for conduction of air for cooling the support and structures supported thereby, hollow fairings extending across the exhaust duct around the struts and formed with air exhaust openings, and means connecting the support to the fairings for supplying the fairings with cooling air from the support.

10. A turbine engine comprising, in combination, a stator, a rotor therein, means including a generally cylindrical casing attached to the stator and an inner wall member defining a substantially annular passage for flow of motive fluid to or from the turbine, a turbine rotor bearing, and a mount for the bearing within the inner wall member, a polygonal tubular frame circumscribing the casing, the sides of the frame being attached to the casing, a strut connected to each corner of the frame and fixed to the bearing mount at such a location as to extend generally tangentially from the bearing mount, the frame and struts constituting a support for the bearing mount, the support being tubular to provide a passage for conduction of air for cooling to the bearing mount, the frame constituting a manifold to conduct air to the struts, and hollow fairings extending across the said annular passage enclosing the struts and formed with air exhaust openings, the fairings being connected to the casing and inner wall member and constituting a support for the inner wall member and being supplied with cooling air from within the inner wall member supplied thereto through the said bearing mount support.

11. A bearing support comprising, in combination, a casing, a rigid polygonal frame, the sides of which are fixed to the casing, a bearing structure located centrally within the frame, and a plurality of struts fixed to the bearing structure and extending therefrom at a substantial angle to a radial direction relative to the axis of the frame, the frame and struts being coplanar, each strut being fixed to the frame at a corner thereof.

12. A bearing support comprising, in combination, an outer casing having an axis, a rigid polygonal frame, the sides of which are fixed to the casing, a bearing structure located centrally within the casing, a plurality of struts fixed to the bearing structure and extending therefrom at a substantial angle to a radial direction from the axis, each strut being fixed to the frame at a corner thereof, an inner casing within the outer casing and around the bearing structure, and hollow members enclosing the struts extending between the said casings and supported by at least one of the casings, each hollow member comprising a part slidable with respect to one of the casings to accommodate differential expansion by sliding of the said part with respect to the said casing.

13. A bearing support comprising, in combination, an outer casing having an axis, a rigid hexagonal frame, the sides of which are fixed to the casing, a bearing structure located centrally within the casing, six struts fixed to the bearing structure and extending therefrom at a substantial angle to a radial direction from the axis, each strut being fixed to the frame at a corner thereof, the frame and struts being coplanar, an inner casing within the outer casing and around the bearing structure, and hollow members enclosing the struts extending between the said casings and supported by at least one of the casings, each hollow member comprising a part slidable with respect to one of the casings to accommodate differential expansion by sliding of the said part with respect to the said casing.

14. A bearing support comprising, in combination, an outer casing having an axis, a rigid polygonal frame, the sides of which are fixed to the casing, a bearing structure located centrally within the casing, a plurality of struts fixed to the bearing structure and extending therefrom at a substantial angle to a radial direction from the axis, each strut being fixed to the frame at a corner thereof, an inner casing within the outer casing and around the bearing structure, and hollow members enclosing the struts extending between the said casings and supported by at least one of the casings, each hollow member comprising a part slidable with respect to one of the casings to accommodate differential expansion by sliding of the said part with respect to the one of said casings, at least one of the struts being hollow to provide for conduction of a cooling medium therethrough and being in communication with the said hollow members for discharge of at least part of the cooling medium into the hollow members.

15. A bearing support comprising, in combination, an outer casing having an axis, a bearing structure located centrally within the casing, a plurality of struts fixed to the bearing structure and extending therefrom at a substantial angle to a radial direction from the axis, each strut being rigidly connected to the outer casing, an inner casing within the outer casing and around the bearing structure, and hollow members enclosing the struts extending between the said casings and supported by at least one of the casings, each hollow member comprising a part slidable with respect to one of the casings to accommodate differential expansion by sliding of the said part with respect to the one of said casings.

16. A bearing support comprising, in combination, an outer casing having an axis, a bearing structure located centrally within the casing, a plurality of struts fixed to the bearing structure and extending therefrom at a substantial angle to a radial direction from the axis, each strut being rigidly connected to the outer casing, an inner casing within the outer casing and around the bearing structure, and hollow members enclosing the struts extending between the said casings and supported by at least one of the casings, each hollow member comprising a part slidable with respect to one of the casings to accommodate differential expansion by sliding of the said part with respect to the one of said casings, at least one of the struts being hollow to provide for conduction of a cooling medium therethrough and being in communication with the said hollow members for discharge of at least part of the cooling medium into the hollow members.

17. A bearing support comprising, in combination, a casing having an axis, a bearing structure located centrally within the casing, a plurality of hollow struts fixed to the bearing structure and extending therefrom at a substantial angle to a radial direction relative to the said axis, the struts being connected to the casing in a common plane transverse to the said axis, means on the casing bracing the casing structurally in the plane of connection of the struts thereto, hollow fairings connected to the casing enclosing the struts, cooling fluid supplying means connected to the struts, means defining an open conduit connected to the struts and the fairings providing a fluid connection from the struts to the fairings for circulating at least part of said fluid through the fairings, and means defining an outlet opening from the fairings for the said fluid.

18. A turbine comprising, in combination, a stator; a rotor; means defining a generally annular passage for flow of motive fluid to or from the turbine including a casing attached to the stator forming the outer wall of the passage; turbine rotor bearing structure means located at the same end of the turbine as the said passage; a support for the bearing structure means comprising a plurality of hollow rigid deformable struts interconnecting the bearing structure means and the passage defining means and fixed to one of the said means; the struts being disposed at an angle to the radial direction from the turbine axis so that relative expansion of the struts and the said means may be accommodated by flexion of the struts accompanied by relative movement of the said means; hollow fairings around the struts extending across the said passage; cooling fluid supplying means connected to the struts; means defining an open conduit connected to the struts and the fairings providing a fluid connection from the struts to the fairings for circulating at least part of said fluid through the fairings; and means defining an outlet opening from the fairings for the said fluid.

References Cited in the file of this patent

UNITED STATES PATENTS

| | | |
|---|---|---|
| 2,410,450 | Kroon | Nov. 5, 1946 |
| 2,484,952 | Ledwith | Oct. 18, 1949 |
| 2,616,662 | Mierley | Nov. 4, 1952 |

FOREIGN PATENTS

| | | |
|---|---|---|
| 599,829 | Great Britain | Mar. 22, 1948 |
| 822,330 | France | Feb. 22, 1943 |